United States Patent [19]

Mikaila

[11] 4,095,938
[45] Jun. 20, 1978

[54] ARCTIC VEHICLE BATTERY HEATER

[76] Inventor: Joseph J. Mikaila, 2643 Lake Charnwood, Troy, Mich. 48084

[21] Appl. No.: 779,856

[22] Filed: Mar. 21, 1977

[51] Int. Cl.² .............................................. F24J 3/00
[52] U.S. Cl. .................................. 432/225; 431/268; 237/12.3 C; 123/142.5 R; 219/202
[58] Field of Search ................ 432/225, 62, 159, 175, 432/200, 204; 237/12.3 R, 12.3 C; 219/200, 202, 521, 523; 123/142.5 R, 142.5 E; 431/268, 325; 126/92 R, 92 AC

[56] References Cited

U.S. PATENT DOCUMENTS

| | | | |
|---|---|---|---|
| 2,418,792 | 4/1947 | Riggs | 123/142.5 E |
| 2,516,048 | 7/1950 | Endress | 123/142.5 E |
| 2,626,971 | 1/1953 | Mansoff | 219/202 |
| 3,110,633 | 11/1963 | Bachmann | 219/202 |
| 3,351,330 | 11/1967 | Kobayashi | 432/225 |
| 3,796,207 | 3/1974 | Olson | 123/142.5 R |

Primary Examiner—John J. Camby
Assistant Examiner—Henry C. Yuen
Attorney, Agent, or Firm—Peter A. Taucher; John E. McRae; Nathan Edelberg

[57] ABSTRACT

In an arctic military vehicle, one or more heating units is/are positioned against the outer surface of the battery to heat the battery electrolyte and thereby improve battery output capability during the critical engine start-up period. Each heating unit includes an internal self-contained heat source, thereby enabling the system to be used in wilderness areas remote from building energy sources. The invention is particularly applicable to arctic military vehicles that might be required to move through relatively uninhabited enemy areas where stationary energy sources might be unknown or non-existent.

5 Claims, 4 Drawing Figures

ARCTIC VEHICLE BATTERY HEATER

The invention described herein may be manufactured, used, and licensed by or for the Government for governmental purposes with payment to me of any royalty thereon.

BACKGROUND AND SUMMARY OF THE INVENTION

U.S. Pat. No. 3,110,633 issued in the name of W. D. Bachmann discloses a heating system for a vehicle battery; the aim of the heating system is to increase the electrical output of the battery to effective levels during start-up of the vehicle at low ambient temperatures, for example sub-zero temperatures. The patented system is constructed so that heat energy from a remote source is directed to the space immediately surrounding the battery; alternately the heat is stored within a fusible substance surrounding the battery. The requirement for an external heat source (such as a domestic hot water supply or electric power from a building or generator) presents certain disadvantages and difficulties. For example the vehicle must be located relatively close to the external heat source, not miles or fractions of miles as might be the case with military vehicles operating in arctic atmospheres over enemy terrain where location of power facilities might be unknown or non-existent. Use of a stored heat source is not entirely satisfactory when the vehicle is left unattended for a prolonged time period; the heat leaks away so that it is not available when needed.

The present invention proposes a battery-heating system wherein the heat energy is developed by catalytic heaters of the hand-warmer type. Such heaters have their own fuel supply. They develop relatively low temperature glows in the neighborhood of 500° F at the catalyst as compared to 2000° F open flame temperature; therefore the catalytic heater is not likely to destruct the battery casing. The relatively low glow temperatures consume the fuel (e.g. lighter fluid or unleaded gasoline) at low rates so that a given capacity (size) fuel reservoir will keep the burner going for an extended period of time. The catalytic burner can thereby be put into operation when the military vehicle is initially stopped, e.g. at the end of the day; the burner will remain on during the night so that the battery is at a relatively elevated temperature (suitable for delivering maximum electrical energy) the next morning. The catalytic burner requires no connection to an electric current source; therefore the burner can be used in wilderness areas where stationary electric power sources may be non-existent or temporarily interrupted.

THE DRAWINGS

Figure 1:
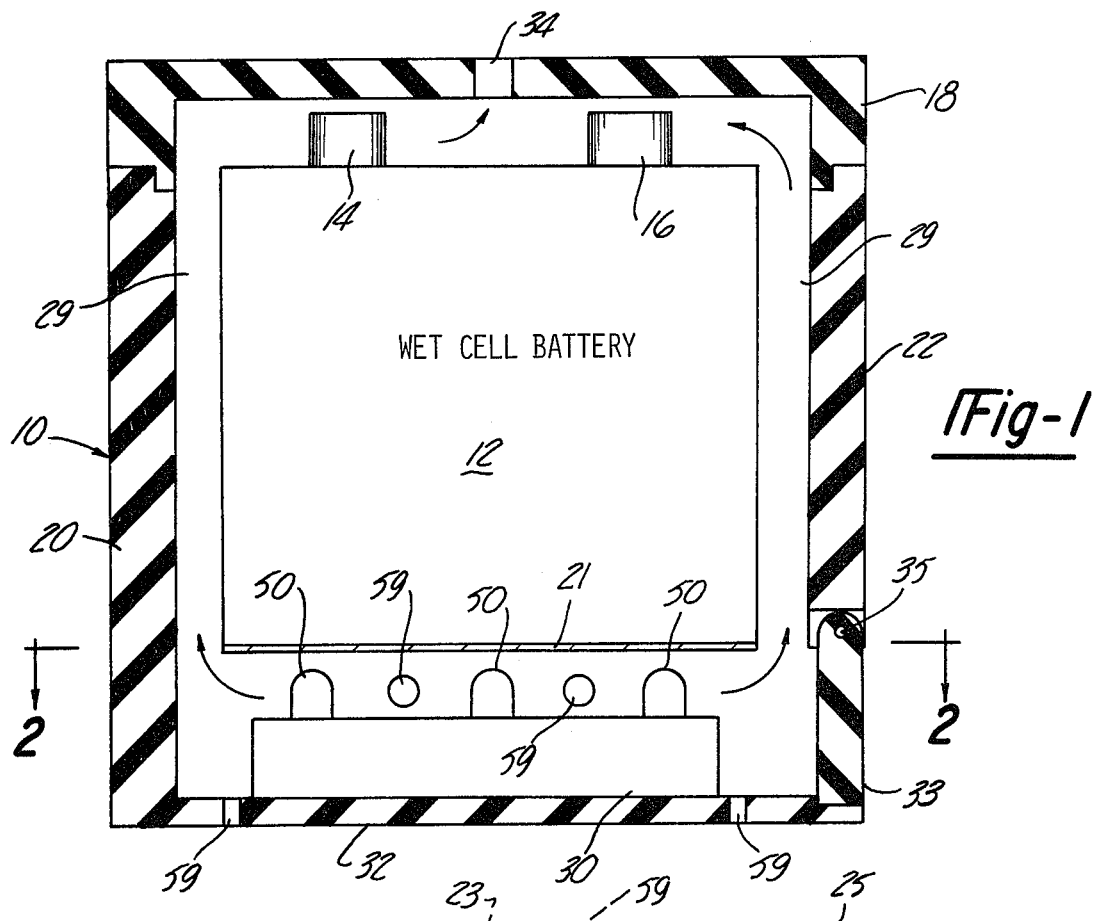
FIG. 1 is a transverse sectional view taken through a battery container or receptacle embodying this invention.

FIG. 1 is a section through an upright receptacle or box 10 fixed within the engine compartment of a military vehicle, not shown. The box is designed to removably receive a conventional wet cell battery 12 having electric terminal means 14 and filler caps 16 (only one of which is visible). The battery is a conventional item obtainable from any of several manufacturers. Box 10 preferably encircles the battery on the bottom and all four sides; therefore it may be necessary to equip the battery with a handle (not shown) for lowering and raising purposes. As shown in the drawing, box 10 is formed of rubber having some thermal insulation capabilities. In practice the box thermal capabilities might be enhanced if the box were of double wall construction, with foam insulation between the inner and outer skin areas of each wall; the aim would be to confine heat as much as possible to the space within the box. Heat confinement may be enhanced by the provision of a removable cover 18 over the battery upper face. Slots or analogous openings would be necessary in the cover to accommodate the battery cables, not shown.

The battery is arranged on a false metallic wall 21 that rests on shoulders 23 formed in box side walls 25 and 27. Walls 25 and 27 are spaced apart by a distance that corresponds to the length of the battery; therefore the battery fits snugly between walls 25 and 27. The other upright side walls 20 and 22 of box 10 are spaced from the outer side surfaces of the battery casing to form passages 29 for heated gases flowing upwardly from a catalytic heater 30.

As best seen in FIG. 1, the heater is positioned on the box bottom wall 32 in the space beneath battery 12. Heated gases generated by the catalytic heater flow into passages 29 and eventually through escape openings 34 in cover 18. Openings 34 are preferably sized to restrict the escape rate of the hot gases, thereby promoting heat transfer from the gases into the battery electrolyte. When cover 18 is removed from box 10 the battery can be lifted out of the box, as might be necessary for replacement purposes. Cover 18 would not be necessary during summertime operations.

Heater 30 is a portable unit that can be removed from box 10 for refueling or when it is not needed for battery-heating purposes. A closure 33 is pivotally mounted for upward swinging movement about pivot axis 35 when it is desired to slide the heater into or out of the "use" position shown in FIG. 1.

Figure 3:
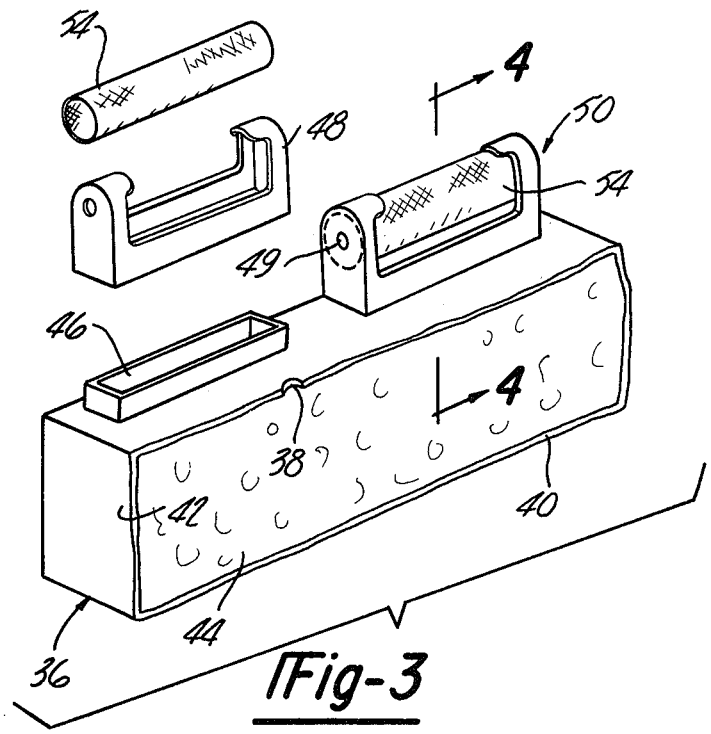
FIG. 3 is a fragmentary perspective view of a catalytic heater usable in practice of the invention.
Figure 4:
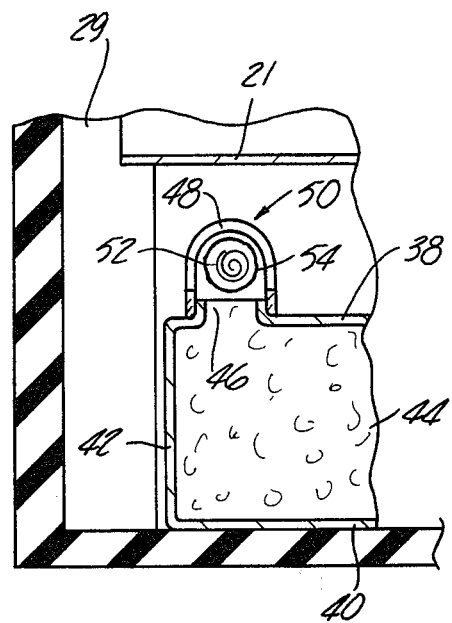
FIG. 4 is a sectional view taken on line 4—4 in FIG. 3.

The structure of the catalytic heater is best visualized from FIGS. 3 and 4. As there shown, the heater comprises a liquid fuel reservoir 36 having a generally flat rectangular pancake shape. The reservoir includes top wall 38, bottom wall 40, and connecting side walls 42. Disposed within the defined reservoir space 44 is a mass of cotton fibers or similar liquid absorbent material. While the heater is located outside box 10 liquid lighter fuel may be poured into one of six openings 46 in top wall 38 of the fuel reservoir. The fuel saturates the cotton fibers.

Fitting over each opening 46 is a bottomless hood 48 that forms part of a burner 50. Each burner further includes a fibrous wick 52 rolled into a loose spiral shape (as seen in FIG. 4), and a surrounding metal gauze or screen 54 of tubular form. The screen 54 is preferably formed with a nickel or platinum coating thereon to act as a catalyst for glow-like flameless combustion of the fuel received through the associated opening 46. A small hole 49 may be formed in each end wall of hood 48.

Figure 2:
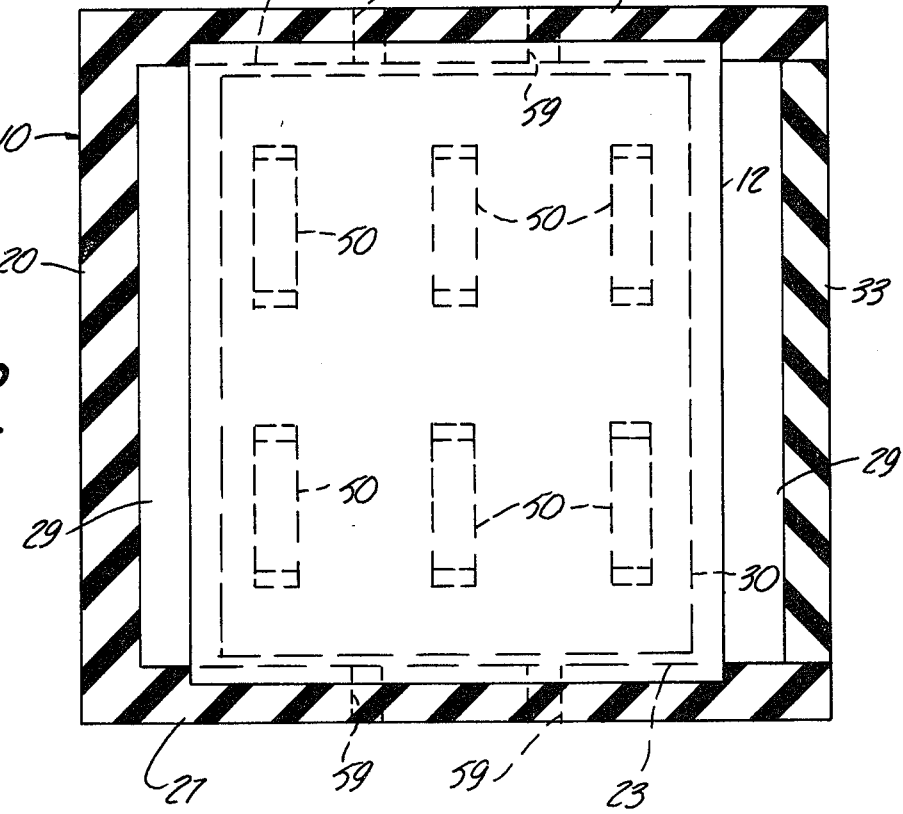
FIG. 2 is a sectional view taken on line 2—2 in FIG. 1.

The burner assembly can be fabricated by inserting the fibrous wick 52 into sleeve 54, positioning the screen within hood 48, and inserting the hood onto the flanges that define opening 46. Detents, not shown, may be formed in the hood 48 walls to provide a press fit relation between the hood and the mounting flanges. The hood may be pulled upwardly when it is necessary to add new fuel to reservoir 36. FIG. 3 shows one burner in a disassembled condition and a second burner in an assembled condition. The complete catalytic heater comprises six burners, as shown schematically in FIG. 2.

The construction of each burner 50 is not novel. Similarly constructed burners have been individually employed in catalytic heaters used as hand warmers. After the burners are ignited by a match or cigarette lighter they will produce glow-type combustion (as opposed to flame type combustion). When used as a hand warmer the burner is usually enclosed in an apertured metal housing that is in turn contained within a porous cloth bag; the bag is held in the user's hand. Very little combustion air is required for the hand warmer function. In the present battery-heater arrangement needed combustion air may be admitted to the individual burners through small ports 59 in box walls 25, 27 and 32. The heated gases generated by the burners flow across the undersurface of the battery, upwardly through passages 29, and eventually through openings 34 in cover 18. Each burner 50 is ignited while heater 30 is located outside of box 10.

A principal advantage of this battery heater is the relatively large heat content of the liquid fuel. One quart of fuel contains about 30,000 B.T.U. of heat energy, enough to provide in excess of 150 hours of battery heat operation (assuming arctic temperatures of −50° F and heat efficiency of 50 percent). Stored heat concepts, as proposed in aforementioned U.S. Pat. No. 3,110,633, do not provide nearly this amount of heat with any reasonably sized container structure. Another advantage of the catalytic heater is the low burner temperature that automatically precludes destruction of the battery. A further advantage is the fact that the catalytic heater can be put into operation at any time; the burner-initiation time is not dependent on connection to an external power source or automotive generator.

I wish it to be understood that I do not desire to be limited to the exact details of construction shown and described for obvious modifications will occur to a person skilled in the art.

I claim:

1. In an arctic vehicle equipped with battery ignition: the improvement comprising means for heating the vehicle battery to improve its electrical output energy capability preparatory to start-up of the vehicle, said heating means comprising at least one catalytic heater positionable in close adjacency to an outer side surface of the battery casing for directing heat energy through said casing into the battery electrolyte, an upright battery-reception box having sidewalls thereof spaced from the battery casing surfaces to form passages for heated gases flowing upwardly from the catalytic heater, and means forming gas escape openings therein tending to confine hot gases to the space surrounding the battery.

2. In the arctic vehicle of claim 1: the improvement further comprising a cover for the box, said cover overlying the battery.

3. In the arctic vehicle of claim 2: the further improvement wherein the catalytic heater is disposed within the box directly below the battery so that the heater generates heated gases in the space beneath the battery bottom wall.

4. In the arctic vehicle of claim 3: the further improvement wherein the box is provided with an access opening that accommodates placement of the heater in its operating position without removal of the battery from the box, whereby the heater can be taken out of the box when no longer needed for battery-heating purposes.

5. In the arctic vehicle of claim 4: the further improvement wherein the catalytic heater comprises a fuel container having a number of fuel escape ports in its upper wall, a fuel-adsorbent wick above each port, and a wire gauze flame holder surrounding each wick, each flame holder being formed of a metal that acts as a catalyst for flameless combustion of the fuel.

* * * * *